United States Patent

Goebel et al.

[11] Patent Number: 4,471,035
[45] Date of Patent: Sep. 11, 1984

[54] ELECTROCHEMICAL BATTERY

[75] Inventors: Franz Goebel, Sudbury; Morton A. Slavin, Marblehead, both of Mass.

[73] Assignee: GTE Communications Products Corporation, Stamford, Conn.

[21] Appl. No.: 494,151

[22] Filed: May 13, 1983

[51] Int. Cl.³ .............................................. H01M 6/48
[52] U.S. Cl. .................................... 429/101; 429/154
[58] Field of Search ............... 429/152, 153, 154, 110, 429/116, 52, 101

[56] References Cited

U.S. PATENT DOCUMENTS 2,684,989 7/1954 Wilburn .............................. 429/154
4,287,273 9/1981 Harney et al. ..................... 429/153

FOREIGN PATENT DOCUMENTS 3122080 3/1982 Fed. Rep. of Germany ...... 429/116

Primary Examiner—Donald L. Walton
Attorney, Agent, or Firm—David M. Keay

[57] ABSTRACT

A battery of electrochemical cells employing several identical housing sections of conductive material stacked in a series arrangement with insulation between them at the points of connection. Each two adjacent housing sections form an enclosed chamber. Each chamber contains the electrochemical system of an electrochemical cell with the anode members in contact with one of the housing sections forming the chamber and the cathode members in contact with the other of the housing sections forming the chamber. The electrochemical cells within each chamber form a battery of cells arranged in series both physically and electrically with each housing section serving as the positive terminal for the cell of one chamber and the negative terminal for the cell of an adjacent chamber.

4 Claims, 1 Drawing Figure

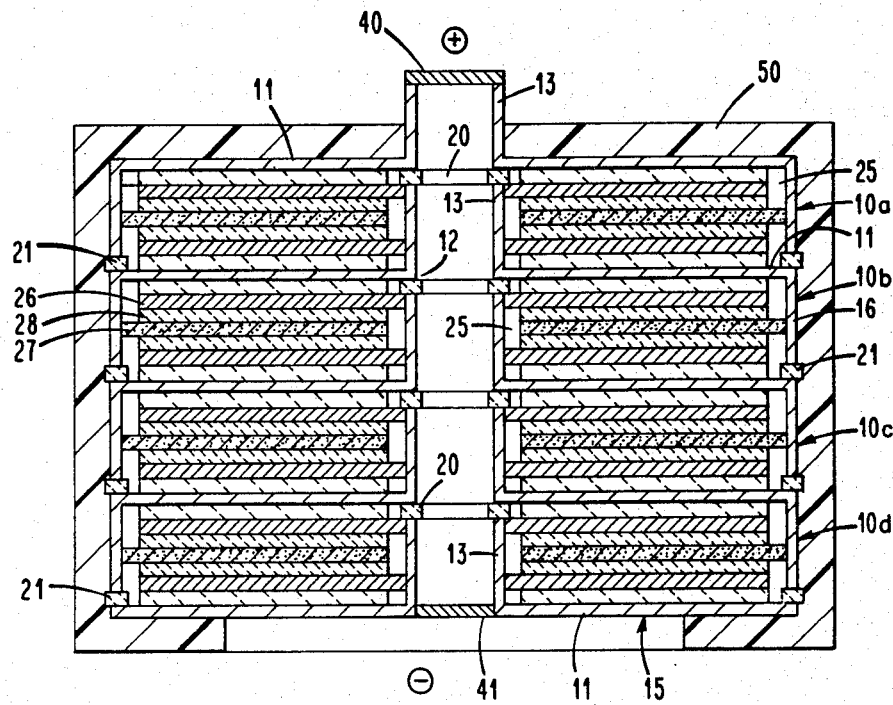

ELECTROCHEMICAL BATTERY

BACKGROUND OF THE INVENTION

This invention relates to electrochemical cells. More particularly, it is concerned with a battery of electrochemical cells arranged in series.

It is frequently necessary for electrochemical cells to be connected in series in order to provide voltages higher than those produced by an individual cell. For example, lithium/thionyl chloride electrochemical cells normally discharge at 3.5 volts, and for many applications it is necessary to employ these cells in applications having higher voltage requirements.

Typically, each cell is packaged in an individual case having exposed positive and negative terminals. As is well understood, to provide a series of cells the positive terminal of each cell is connected to the negative terminal of the next cell in the series. The individual cells of the series may be packaged within a single case with appropriate terminal connections to provide a unitary battery structure. With batteries assembled in this manner the overall weight and volume is adversely affected by the packaging required by each individual cell plus the additional wiring, insulation, and structure required to support the cells in the form of a battery of unitary assembly.

SUMMARY OF THE INVENTION

A battery of electrochemical cells in accordance with the present invention comprises a plurality of similar housing sections of conductive material arranged in series. Each housing section is electrically insulated from the adjacent housing sections. Each two adjacent housing sections form an enclosed chamber between them. Each chamber contains an electrochemical system comprising an anode electrode member, a cathode electrode member, an an electrolytic solution in contact with the anode electrode member and the cathode electrode member. The anode electrode member is in electrical contact with the housing section of one of the housing sections forming the chamber, and the cathode electrode member is in electrical contact with the housing section of the other housing section forming the chamber. The electrochemical cells provided by the electrochemical systems within each chamber form a battery of electrochemical cells arranged in series with each housing section serving as the positive terminal for the electrochemical system within one chamber and the negative terminal for the electrochemical system within an adjacent chamber.

BRIEF DESCRIPTION OF THE DRAWING

The single FIGURE of the drawing illustrates an electrochemical battery in accordance with the present invention in a cross-sectioned elevational view.

For a better understanding of the present invention, together with other and further objects, advantages, and capabilities thereof, reference is made to the following discussion and appended claims in connection with the above-described drawing.

DETAILED DESCRIPTION OF THE INVENTION

The single FIGURE of the drawing illustrates a battery of electrochemical cells arranged in series. The battery is generally cylindrical in shape and is fabricated from several identical housing sections 10a–10d and a modified housing section 15. The housing sections are of a suitable metal, for example stainless steel or nickel. Each of the identical housing sections 10a–10d includes a flat planar disc 11 having a central opening 12 with a first hollow cylindrical or tubular member 13 affixed to the disc at the edge of the central opening 12. The first cylindrical member 13 extends in one direction (upward as shown in the FIGURE) normal to the plane of the disc 11. Each identical housing section 10a–10d also includes a second hollow cylindrical member 16 affixed to the disc 11 at its outer edge. The second cylindrical member 16 extends in the opposite direction (downward as shown in the FIGURE) normal to the plane of the disc 11.

As can be seen from the FIGURE the housing sections are stacked in a series arrangement. The housing sections are electrically insulated from each other. A first ring of insulating material 20 is disposed between the edge surface at the end of each first cylindrical member 13, except the one that is uppermost, and the disc 11 of the housing section above it at the periphery of the central opening 12 in the disc 11. A second ring of insulating material 21 is disposed between the edge surface at the end of the second cylindrical member 16 of each identical housing section 10a–10d and the disc 11 of the housing section below it at the outer edge of the disc 11. The rings of insulating material 20 and 21 seal the housing sections together with each two adjacent housing sections forming an enclosed chamber 25 of annular configuration between them.

The lowermost housing section 15 is a modified section. It includes a flat, planar disc 11 and a first cylindrical member 13 of small diameter similar to the other housing sections 10a–10d. It does not include a second cylindrical member of large diameter. Rings of insulating material 20 and 21 seal the modified housing section 15 to the adjacent housing section 10d to form the lowermost chamber between them.

Within each chamber 25 formed by two adjacent housing sections is an electrochemical system of an electrochemical cell. The individual electrochemical cells may be lithium/fluid oxyhalide electrochemical cells of well known type. Although any of various known arrangements of stacks of electrochemical cell elements may be employed in each chamber, preferably the stack is an arrangement as disclosed in U.S. Pat. No. 4,284,691 entitled "Electrochemical Cell" which issued on Aug. 18, 1981, to Franz Goebel and William T. McHugh.

The electrochemical system within each chamber 25 includes a set of substantially flat, planar, generally circular anode electrode members 26 and a set of substantially flat, planar, generally circular cathode electrode members 27. The anode electrode members 26 and the cathode electrode members 27 are arranged in alternation and are separated from each other and the discs 11 of the housing sections by intervening separators 28 of insulating material. The anode electrode members 26 have a central opening of a diameter smaller than the outer diameter of the first cylindrical members 13 and an outer diameter smaller than the inner diameter of the second cylindrical members 16. The cathode electrode members 27 have a central opening of a diameter larger than the outer diameter of the first cylindrical members 13 and an outer diameter larger than the inner diameter of the second cylindrical members 16. Thus, within each chamber 25 the anode electrode members 26 make direct physical and electrical contact with the first cylindrical member 13 of the lower of the two housing sections forming the chamber, and are spaced from the second cylindrical member 16 of the upper of the two housing sections forming the chamber. The cathode electrode members 27 makes direct physical and electrical contact with the second cylindrical member 16 of the upper of the two housing sections forming the chamber, and are spaced from the first cylindrical member 13 of the lower of the two housing sections forming the chamber. With this arrangement the lower housing section of each chamber becomes the negative terminal of the cell and the upper housing section becomes the positive terminal of the cell.

The anode electrode members 26 include an oxidizable active material, specifically lithium. The cathode electrode members 27 contain porous carbon conglomerate material and serve as cathode current collectors. To complete the electrochemical system each chamber 25 contains an electrolytic solution of a reducible liquid cathode material, specifically thionyl chloride, and an electrolyte solute, specifically lithium tetrachloroaluminate, dissolved therein.

In order to complete the battery structure the uppermost and/or the lowermost housing sections may be modified from the identical housing sections. As illustrated in the FIGURE, the uppermost housing section 10a is the same as the housing sections 10b–10d. No ring of insulating material is needed at the edge surface of the smaller cylindrical member 13, however, and a disc 40 of conductive material may be employed to close the top of the cylinder. As described previously the lowermost housing section 15 does not include a larger cylindrical member. A disc 41 of conductive material may be placed across the central opening 12 in the disc 11 to close the lower end of the small cylindrical member 13. Alternative arrangements may be employed for the uppermost and lowermost housing sections as required for a particular application. Also as illustrated in the FIGURE the smaller cylindrical members 13 form a series of central openings within their walls. If desired the cylindrical members 13 may be solid, or the series of central openings may be filled as with a plastic potting material. In any event each of the housing sections must be electrically insulated from the others.

As illustrated in the FIGURE the battery may be enclosed in a protective case 50 as of a suitable plastic potting material. The battery illustrated contains four electrochemical cells arranged in series. Since a housing section serves as the negative terminal for the electrochemical cell in the chamber for which it is the lower housing section and serves as the positive terminal for the electrochemical cell in the chamber for which it is the upper housing section, the lowermost housing section 15 becomes the negative terminal of the battery and the uppermost housing section 10a becomes the positive terminal of the battery.

Batteries in accordance with the present invention employ several identical housing sections which need be modified only at the upper and/or lower ends of the battery. Thus a battery containing a greater number of cells requires a greater number of identical housing sections but not a greater number of specialized parts. The battery requires no additional interconnections or jumpers between terminals of individual cells to connect the cells in electrical series. Thus the IR drops caused by such interconnections are eliminated. The battery is relatively compact since no additional structural components for supporting and packaging individual cells as a unitary battery nor insulation for providing protection between individual cells are required. Thus, the electrochemical energy of the battery per unit of weight and per unit of volume is high.

While there has been shown and described what is considered a preferred embodiment of the present invention, it will be obvious to those skilled in the art that various changes and modifications may be made therein without departing from the invention as defined by the appended claims.

What is claimed is:

1. A battery of electrochemical cells comprising
   a plurality of similar housing sections of conductive material arranged in series;
   each housing section including
      a flat, planar disc of conductive material having a central opening,
      a first cylindrical member of conductive material contiguous the edge of the disc at the central opening, extending in one direction normal to the plane of the disc, and having an edge surface at the end thereof spaced from the disc,
      a second cylindrical member of conductive material contiguous the outer edge of the disc, extending in the opposite direction normal to the plane of the disc, and having an edge surface at the end thereof spaced from the disc,
      a first member of insulating material contiguous said edge surface at the end of each of said first cylindrical members,
      a second member of insulating material contiguous said edge surface at the end of each of said second cylindrical members;
   said first member of insulating material contiguous the edge surface at the end of the first cylindrical member of each housing section except the first housing section in the series being contiguous the disc of the preceding housing section in the series adjacent to said central opening;
   said second member of insulating material contiguous the edge surface at the end of the second cylindrical member of each housing section except the last housing section in the series being contiguous the disc of the succeeding housing section in the series adjacent to the outer edge;
   each two adjacent housing sections in the series forming an enclosed chamber between them;
   each chamber containing an electrochemical system comprising
      an anode electrode member,
      a cathode electrode member,
      an electrolytic solution in contact with the anode electrode member and the cathode electrode member,
      the anode electrode member being in electrical contact with one of said first and second cylindrical members of one of the housing sections forming the chamber, and
      the cathode electrode member being in electrical contact with the other of said first and second cylindrical members of the other housing section forming the chamber
   whereby the electrochemical cells provided by the electrochemical systems within each chamber form a battery of electrochemical cells arranged in series with each housing section serving as the positive terminal for the electrochemical system within one chamber and as the negative terminal for the electrochemical system within an adjacent chamber.

2. A battery of electrochemical cells in accordance with claim 1 wherein each of said electrochemical systems within a chamber comprises a set of substantially flat, planar generally circular anode electrode members;

a set of substantially flat, planar generally circular cathode electrode members;

said anode electrode members and said cathode electrode members being arranged in alternation and separated by separators of insulating material;

the electrode members of one set having a central opening of a diameter greater than the outer diameter of the first cylindrical member of a housing section and having an outer diameter greater than the inner diameter of the second cylindrical member of a housing section whereby the electrode members of the set make electrical contact to the second cylindrical member and are electrically isolated from the first cylindrical member of the housing sections forming the chamber; and the electrode members of the other set having a central opening of a diameter less than the outer diameter of the first cylindrical member of a housing section and having an outer diameter less than the inner diameter of the second cylindrical member of a housing section whereby the electrode members of the set make electrical contact to the first cylindrical member and are electrically isolated from the second cylindrical member of the housing sections forming the chamber.

3. A battery of electrochemical cells in accordance with claim 2 wherein each anode electrode member includes an oxidizable active material;

each cathode electrode member includes porous conductive material; and said electrolytic solution comprises a reducible liquid cathode material and an electrolyte solute dissolved therein.

4. A battery of electrochemical cells in accordance with claim 3 wherein the oxidizable active material includes lithium; and said reducible liquid cathode material includes a fluid oxyhalide.

* * * * *